(12) United States Patent
Isa et al.

(10) Patent No.: US 12,467,012 B2
(45) Date of Patent: Nov. 11, 2025

(54) GREASE COMPOSITION FOR VEHICULAR HUB UNIT BEARINGS

(71) Applicants: KYODO YUSHI CO., LTD., Fujisawa (JP); NSK Ltd., Tokyo (JP)

(72) Inventors: Kazuki Isa, Fujisawa (JP); Yuki Takeyama, Shanghai (CN); Masatoshi Ijima, Fujisawa (JP); Suguru Sugawara, Fujisawa (JP); Hiroaki Ishikawa, Fujisawa (JP)

(73) Assignees: KYODO YUSHI CO., LTD., Kanagawa (JP); NSK LTD., Tokyo (JP)

( * ) Notice: Subject to any disclaimer, the term of this patent is extended or adjusted under 35 U.S.C. 154(b) by 0 days.

(21) Appl. No.: 18/689,492

(22) PCT Filed: Sep. 13, 2022

(86) PCT No.: PCT/JP2022/034199
§ 371 (c)(1),
(2) Date: Mar. 6, 2024

(87) PCT Pub. No.: WO2023/038149
PCT Pub. Date: Mar. 16, 2023

(65) Prior Publication Data
US 2024/0263099 A1  Aug. 8, 2024

(30) Foreign Application Priority Data
Sep. 13, 2021 (JP) .................................. 2021-148638

(51) Int. Cl.
*C10M 171/02* (2006.01)
*C10M 115/08* (2006.01)
*C10M 129/10* (2006.01)
*C10M 129/26* (2006.01)
*C10M 137/10* (2006.01)
*C10M 169/06* (2006.01)
*F16C 33/66* (2006.01)

(52) U.S. Cl.
CPC ........ *C10M 171/02* (2013.01); *C10M 115/08* (2013.01); *C10M 129/10* (2013.01); *C10M 129/26* (2013.01); *C10M 137/105* (2013.01); *C10M 169/06* (2013.01); *F16C 33/6633* (2013.01); *C10M 2207/125* (2013.01); *C10M 2215/1026* (2013.01); *F16C 2210/04* (2013.01); *F16C 2326/02* (2013.01)

(58) Field of Classification Search
CPC ............ C10N 2050/10; C10N 2030/06; C10N 2030/12; C10N 2040/02; C10N 2020/02; C10N 2030/08; F16C 19/186; F16C 33/66; F16C 19/18; F16C 33/6633; F16C 2210/04; F16C 2326/02; C10M 169/06; C10M 129/10; C10M 115/08; C10M 137/105; C10M 129/26; C10M 169/048; C10M 171/02; C10M 2215/1026; C10M 2217/0456; C10M 2207/288; C10M 2207/125; C10M 2205/0285; C10M 2207/026; C10M 2223/047
See application file for complete search history.

(56) References Cited

U.S. PATENT DOCUMENTS

| | | | |
|---|---|---|---|
| 2009/0003742 A1* | 1/2009 | Nakatani | B60B 27/0005 508/552 |
| 2010/0035779 A1 | 2/2010 | Fujinami et al. | |
| 2012/0314985 A1 | 12/2012 | Saita et al. | |
| 2014/0193110 A1 | 7/2014 | Soga et al. | |
| 2014/0199009 A1 | 7/2014 | Inami et al. | |
| 2015/0252282 A1* | 9/2015 | Yoshinari | C10M 169/02 508/552 |
| 2018/0298304 A1 | 10/2018 | Yoshizaki et al. | |

FOREIGN PATENT DOCUMENTS

| | | |
|---|---|---|
| JP | 2004224823 A | 8/2004 |
| JP | 2010024440 A | 2/2010 |
| JP | 2011178824 A | 9/2011 |
| JP | 2013082882 A | 5/2013 |
| JP | 2015140415 A | 8/2015 |
| JP | 2017002306 A | 1/2017 |
| WO | 2008044650 A1 | 4/2008 |

OTHER PUBLICATIONS

International Search Report (PCT/ISA/210) with English translation, and Written Opinion (PCT/ISA/237) mailed on Nov. 1, 2022, by the Japanese Patent Office as the International Searching Authority for International Application No. PCT/JP2022/034199.
Ishikawa, "Bearing Technical Trends and Tribology of Hub Unit Bearing", Journal of Japanese Society of Tribologists, vol. 54, No. 9, 2009, pp. 580-585.

* cited by examiner

*Primary Examiner* — Vishal V Vasisth
(74) *Attorney, Agent, or Firm* — Panitch Schwarze Belisario & Nadel LLP

(57) ABSTRACT

A grease composition for vehicular hub unit bearings is provided, in which a base oil is a synthetic hydrocarbon oil having a kinematic viscosity at 40° C. of 25-50 mm²/s, a thickener is an alicyclic aliphatic diurea compound, based on a total mass of the composition, 0.1-5% by mass of a carboxylic acid-based corrosion inhibitor, 0.1-5% by mass of a carboxylic acid salt-based corrosion inhibitor, and 0.1-3% by mass of an amine salt of a fatty acid are contained, and a worked penetration is 220-270.

8 Claims, No Drawings

GREASE COMPOSITION FOR VEHICULAR HUB UNIT BEARINGS

This application is a 371 of PCT/JP2022/034199 filed Sep. 13, 2022.

TECHNICAL FIELD

The present invention relates to a grease composition for vehicular hub unit bearings.

BACKGROUND ART

One method for improving the efficiency of automobiles is reducing the torque of hub unit bearings used in automobile wheels, and similarly, it is important that the grease used has low torque over a wide temperature range from low to high temperatures.

Methods for reducing grease torque include lowering the kinematic viscosity of the base oil as much as possible (Non Patent Literature 1) and softening the grease to reduce grease agitation resistance.

Lowering the kinematic viscosity of the base oil reduces torque by decreasing grease agitation resistance, but can cause insufficient oil film formation leading to surface-originated flaking and reduced lubrication life due to evaporation, resulting in inability of the bearing to achieve its full service life. In addition, especially when the grease is made softer, the grease tends to leak out more easily, leading to reduced lubrication life and insufficient oil film formation causing flaking, with unsatisfactory flaking life.

CITATION LIST

Non Patent Literatures

Non Patent Literature 1: Hiroaki Ishikawa, Technical trends and tribology of hub unit bearing, Journal of Japanese Society of Tribologists, Vol. 54, No. 9, 2009, pp. 580-585

SUMMARY OF INVENTION

Problems to be Solved by the Invention

Therefore, an object of the present invention is to provide a grease composition for vehicular hub unit bearings that has low torque and excellent durability.

Means for Solution of the Problems

The present invention provides the following grease compositions.

1. A grease composition for vehicular hub unit bearings comprising:
   a base oil;
   a thickener; and
   an additive,
   wherein the base oil is a synthetic hydrocarbon oil having a kinematic viscosity at 40° C. of 25-50 mm²/s,
   the thickener is an alicyclic aliphatic diurea compound,
   the additive includes, based on a total mass of the composition, 0.1-5% by mass of a carboxylic acid-based corrosion inhibitor, 0.1-5% by mass of a carboxylic acid salt-based corrosion inhibitor, and 0.1-3% by mass of an amine salt of a fatty acid, and
   a worked penetration is 220-270.

2. The grease composition according to above 1, wherein the thickener is a mixture of a compound represented by formula (1) below, a compound represented by formula (2) below, and a compound represented by formula (3) below:

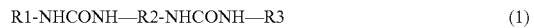   (1)

   (2)

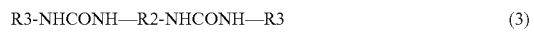   (3)

wherein R2 represents a divalent aromatic hydrocarbon group having 6 to 15 carbon atoms; R1 represents a cyclohexyl group; R3 represents a linear or branched alkyl group having 8 to 22 carbon atoms; and a ratio (R3/(R1+R3))×100 of a molar amount of the linear or branched alkyl group having 8 to 22 carbon atoms to a total molar amount of the cyclohexyl group and the linear or branched alkyl group having 8 to 22 carbon atoms is 10-20%.

3. The grease composition according to above 1 or 2, wherein the thickener is contained in an amount of 10-20% by mass based on the total mass of the composition.

4. The grease composition according to any one of above 1 to 3, further comprising: triphenyl phosphorothioate as an additive.

5. The grease composition according to any one of above 1 to 4, further comprising: a phenolic antioxidant as an additive.

6. A vehicular hub unit bearing comprising:
   a hub constituting an inner ring-equivalent member together with an inner ring element;
   an outer ring; and
   a plurality of ball elements rollably arranged between the hub and the outer ring,
   wherein the water-resistant grease composition according to any one of above 1 to 5 is sealed in a gap formed between the hub and the outer ring where the ball elements are arranged.

Advantageous Effects of Invention

According to the present invention, it is possible to provide a grease composition having low torque, specifically low bearing torque and low starting torque at low temperatures, as well as excellent durability, specifically high-temperature durability. With conventional greases, the torque tends to gradually decrease over operating time from the initial bearing rotation torque (starting torque), but with the present invention, the torque is low from startup and remains stably low compared to conventional greases even after passage of operating time. The composition of the present invention also has water resistance and corrosion prevention equal to or better than the related art. The composition of the present invention also has excellent fretting resistance, specifically low-temperature fretting resistance.

DESCRIPTION OF EMBODIMENTS

<Base Oil>

The base oil contained in the composition of the present invention is a synthetic hydrocarbon oil having a kinematic viscosity at 40° C. of 25-50 mm²/s.

Having a kinematic viscosity at 40° C. of 25-50 mm²/s provides excellent low torque due to low viscous drag of the grease and also excellent durability such as flaking life by securing sufficient oil film thickness. Preferably, the kinematic viscosity at 40° C. is 25-40 mm²/s, and more preferably 25-35 mm²/s. Note that in the present specification, the kinematic viscosity of the base oil at 40° C. is a value measured in accordance with JIS K 2220 23.

By the base oil being a synthetic hydrocarbon oil, the change in kinematic viscosity due to temperature change is small, fluidity at low temperatures is excellent thus providing excellent low torque at low temperatures, and oil film thickness at high temperatures can also be secured thus providing excellent high temperature durability. From the viewpoint of low traction coefficient and low temperature properties, polyalphaolefin is preferable.

Preferably, the base oil is contained in an amount of 70-88% by mass based on the total mass of the composition, and more preferably 75-85% by mass. When the content of the base oil is within this range, a sufficient amount of lubricating oil can be secured and excellent durability can be exhibited.

<Thickener>

The thickener contained in the composition of the present invention is an alicyclic aliphatic diurea compound. The alicyclic aliphatic diurea compound is obtained by reacting an alicyclic monoamine and an aliphatic monoamine with a diisocyanate. Therefore, in addition to the reaction product of the alicyclic monoamine and aliphatic monoamine with the diisocyanate, it includes a reaction product of the alicyclic monoamine with the diisocyanate (so-called alicyclic diurea compound) and a reaction product of the aliphatic monoamine with the diisocyanate (so-called aliphatic diurea compound).

From the viewpoint of low torque and shear stability, it is preferable that the thickener of the present invention is a mixture of a compound represented by formula (1) below, a compound represented by formula (2) below, and a urea compound represented by formula (3) below:

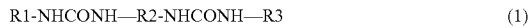

R1—NHCONH—R2—NHCONH—R3 (1)

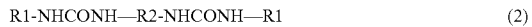

R1—NHCONH—R2—NHCONH—R1 (2)

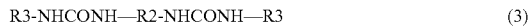

R3—NHCONH—R2—NHCONH—R3 (3)

wherein R2 represents a divalent aromatic hydrocarbon group having 6 to 15 carbon atoms; R1 represents a cyclohexyl group; R3 represents a linear or branched alkyl group having 8 to 22 carbon atoms, preferably a linear alkyl group having 16 to 20 carbon atoms, and most preferably a linear alkyl group having 18 carbon atoms; and a ratio (R3/(R1+R3))×100 of a molar amount of the linear or branched alkyl group having 8 to 22 carbon atoms to a total molar amount of the cyclohexyl group and the linear or branched alkyl group having 8 to 22 carbon atoms is 10-20%. By using such a thickener, it is possible to achieve the desired penetration with a small amount of thickener, thereby achieving low torque by reducing the agitation resistance of the grease composition and simultaneously providing a grease composition excellent in durability. The ratio of the molar amount of the alkyl group is more preferably 10-15%, and particularly preferably 11.5-13.5%.

In particular, the thickener of the present invention is most preferably a mixture of the compound represented by formula (1) in which R1 is a cyclohexyl group, R2 is a group derived from 4,4'-diphenylmethane diisocyanate, and R3 is a linear alkyl group having 18 carbon atoms, the compound represented by formula (2) in which R1 is a cyclohexyl group and R2 is a group derived from 4,4'-diphenylmethane diisocyanate, and the compound represented by formula (3) in which R2 is a group derived from 4,4'-diphenylmethane diisocyanate and R3 is a linear alkyl group having 18 carbon atoms, wherein the molar ratio is 11.5-13.5%. This mixture is most preferable from the viewpoint of thickening ability (i.e. ability to prepare a grease of desired hardness with a small content) and shear stability, and hence low torque and durability.

Preferably, the thickener is contained in an amount of 10-20% by mass based on the total mass of the composition, and more preferably 13-17% by mass. When the content of the thickener is within this range, the grease has the characteristics of a small agitation resistance and an excellent channeling resistance, allowing a satisfactory level of low torque to be achieved.

<Additives>

Examples of the carboxylic acid-based corrosion inhibitors that can be used in the present invention include straight chain fatty acids such as lauric acid and stearic acid, and saturated carboxylic acids having a naphthene nucleus, as monocarboxylic acids. As dicarboxylic acids, succinic acid derivatives such as succinic acid, alkyl succinic acids, alkyl succinic acid half esters, alkenyl succinic acids, alkenyl succinic acid half esters, and succinic acid imides; (tetrapropenyl)butanedioic acid; hydroxy fatty acids, mercapto fatty acids; sarcosine derivatives; and oxidized waxes such as oxidized products of waxes and petrolatum can be mentioned. Among these, alkenyl succinic acid half esters and (tetrapropenyl)butanedioic acid are preferable.

Examples of the carboxylic acid salt-based corrosion inhibitors that can be used in the present invention include metal salts of naphthenic acid, abietic acid, lanolin fatty acids, alkenyl succinic acids, amino acid derivatives, and the like. Examples of the metal elements constituting the salts include cobalt, manganese, zinc, aluminum, calcium, barium, lithium, magnesium, copper, and the like. Among these, zinc naphthenate and zinc abietate are preferable.

Regarding the amine salts of fatty acids that can be used in the present invention, examples of the fatty acids constituting the fatty acid amine salt include preferably fatty acids having 4 to 22 carbon atoms, further preferably fatty acids having 8 to 18 carbon atoms. The fatty acids may be saturated fatty acids or unsaturated fatty acids, and may also be straight chain fatty acids, branched fatty acids, cyclic fatty acids, or hydroxy fatty acids. Specific examples include stearic acid, palmitic acid, myristic acid, lauric acid, isostearic acid, octylic acid, undecylenic acid, oleic acid, hydroxystearic acid, and the like. Amines constituting the above fatty acid amine salts are not particularly limited, but preferably saturated or unsaturated amines having 1 to 42 carbon atoms, further preferably saturated or unsaturated amines having 4 to 22 carbon atoms. Specific examples include octylamine, laurylamine, myristylamine, stearylamine, behenylamine, oleylamine, tallow alkylamines, hardened tallow alkylamines, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamines, dimethyl hardened tallow alkylamines, dimethyloleylamine, and the like. Preferable examples of fatty acid amine salts that can be used in the present invention include particularly a salt of a fatty acid having 8 carbon atoms with an amine having 12 carbon atoms, and a 2-component mixture of a salt of a fatty acid having 18 carbon atoms with an amine having 12 to 20 (mixed) carbon atoms (mass ratio 2:1).

As an additive for imparting water resistance and corrosion prevention in the present invention, it is preferable that the carboxylic acid salt-based corrosion inhibitor contains zinc abietate. It is particularly preferable that the additive of the present invention contains an alkenyl succinic acid half ester, zinc abietate, and a fatty acid amine salt. Most preferably, the additive of the present invention contains an alkenyl succinic acid half ester, (tetrapropenyl)butanedioic acid, zinc naphthenate, zinc abietate, and a fatty acid amine salt.

When the content of the carboxylic acid-based corrosion inhibitor is 0.1-5% by mass, the content of the carboxylic acid salt-based corrosion inhibitor is 0.1-5% by mass, and the content of the fatty acid amine salt is 0.1-3% by mass, excellent water resistance and corrosion prevention are provided, which is thus preferable.

When the content of the carboxylic acid-based corrosion inhibitor is 0.2-3% by mass, the content of the carboxylic acid salt-based corrosion inhibitor is 0.3-3% by mass, and the content of the fatty acid amine salt is 0.3-2.5% by mass, more excellent water resistance and corrosion prevention are provided, which is thus more preferable.

When the content of the carboxylic acid-based corrosion inhibitor is 0.2-1% by mass, the content of the carboxylic acid salt-based corrosion inhibitor is 0.3-1% by mass, and the content of the fatty acid amine salt is 0.5-2% by mass, further excellent water resistance and corrosion prevention are provided, which is thus further preferable.

In particular, when the content of the carboxylic acid-based corrosion inhibitor containing an alkenyl succinic acid half ester is 0.2-0.4% by mass, the content of the carboxylic acid salt-based corrosion inhibitor containing zinc abietate is 0.3-0.4% by mass, and the content of the fatty acid amine salt is 0.9-1.1% by mass, even more excellent water resistance and corrosion prevention are provided, which is thus preferable.

Especially when the total amount of the alkenyl succinic acid half ester and (tetrapropenyl)butanedioic acid is 0.2-0.4% by mass, the total amount of zinc naphthenate and zinc abietate is 0.3-0.4% by mass, and the total amount of the fatty acid amine salt is 0.9-1.1% by mass, the most excellent water resistance and corrosion prevention are provided, which is thus preferable.

The worked penetration of the grease composition of the present invention is 220-270. When the worked penetration is within this range, the channeling properties of the grease composition are excellent. Generally, the grease inside a rolling bearing flows due to rotation. As a result, a small amount of grease remains in the portion where the ball elements run. Most of the remaining grease either remains on the retainer without flowing or is extruded to the side seal portion. This behavior of the grease being excluded from the ball element portion to form tunnels is called channeling. Excellence in channeling properties means that the adhesion amount of grease to the ball element surface and orbit surface is small, allowing reduction of the rotational torque. Preferably, the worked penetration of the composition of the present invention is 230-265, and more preferably 235-265. Note that the worked penetration in the present invention refers to the 60-stroke worked penetration, which is a value measured in accordance with JIS K 2220 7.

By using a synthetic hydrocarbon oil having a kinematic viscosity at 40° ° C. of 25-50 mm$^2$/s as the base oil, the composition of the present invention can lower the rolling viscous drag and traction coefficient. By using an alicyclic aliphatic diurea compound as the thickener, the agitation resistance can be lowered. By setting the penetration to 220-270 with the base oil and thickener, excellent channeling properties can be achieved. These features synergistically provide low bearing torque and low starting torque at low temperatures, and can also improve low temperature fretting resistance.

By using the above combination as an additive, the composition of the present invention can form a strong surface coating film of the additives. As a result, a grease composition excellent in water resistance and durability is obtained.

<Optional Components>

The composition of the present invention can additionally contain optional components such as a wear inhibitor, antioxidant, extreme pressure agent, oiliness improver, metal deactivator, etc. either alone or as a mixture of two or more. However, from the viewpoint of water resistance, it is preferable not to contain barium sulfonate.

The content of the additive is generally 0.01-15% by mass based on the total mass of the lubricant composition, preferably 0.05-12% by mass, and more preferably 0.1-10% by mass.

Examples of wear inhibitors include phosphoric acid esters such as triphenyl phosphorothioate, triphenyl phosphite, and triethyl phosphite; glycerin fatty acid esters such as glycerol monocaprate and glycerol monostearate.

Examples of antioxidants include amine-based antioxidants such as N-n-butyl-p-aminophenol, 4,4'-tetramethyl-diamino-diphenylmethane, α-naphthylamine, N-phenyl-α-naphthylamine, phenothiazine, and alkyldiphenylamine (e.g. p,p'-dioctyldiphenylamine); and phenolic antioxidants such as 2,6-di-tert-butyl-p-cresol (BHT), 2,2'-methylenebis (4-methyl-6-tert-butylphenol), 4,4'-butylidenebis(3-methyl-6-tert-butylphenol), 2,6-di-tert-butyl-phenol, 2,4-dimethyl-6-tert-butylphenol, tert-butylhydroxyanisole (BHA), 4,4'-butylidenebis(3-methyl-6-tert-butylphenol), 4,4'-methylenebis(2,3-di-tert-butylphenol), 4,4'-thiobis(3-methyl-6-tert-butylphenol), and octadecyl-3-(3,5-di-tert-butyl-4-hydroxyphenyl)propionate. Phenolic antioxidants are preferable as the antioxidant. In particular, octadecyl-3-(3,5-di-tert-butyl-4-hydroxyphenyl)propionate is preferable.

Examples of extreme pressure agents include sulfurized oils and/or fats, sulfurized olefins, polysulfides, dialkyl dithiocarbamates such as ashless dithiocarbamates, trioctyl phosphate, tricresyl phosphate, zinc dialkyl dithiocarbamates, and molybdenum dialkyl dithiocarbamates, and dialkyl dithiophosphates such as zinc dialkyl dithiophosphates and molybdenum dialkyl dithiophosphates.

Examples of oiliness improvers include lanolin, methyl oleate, monoesters of polyethylene glycol monooleate, bis(2-ethylhexyl) adipate, diesters of bis(2-ethylhexyl) sebacate, and the like.

Examples of metal deactivators include benzotriazole and the like.

Further containing a wear inhibitor as an additive is preferable since this can further improve the durability of the grease composition. Triphenyl phosphorothioate is particularly preferable as the wear inhibitor. When the composition of the present invention contains triphenyl phosphorothioate, the content thereof is preferably 0.1-5% by mass.

Further containing a phenolic antioxidant as an additive is preferable since this can further improve the durability of the grease composition. Octadecyl-3-(3,5-di-tert-butyl-4-hydroxyphenyl)propionate is particularly preferable as the phenolic antioxidant. When the composition of the present invention contains octadecyl-3-(3,5-di-tert-butyl-4-hydroxyphenyl)propionate, the content thereof is preferably 0.1-3% by mass.

Further containing both a wear inhibitor and a phenolic antioxidant as additives is preferable, and containing triphenyl phosphorothioate and octadecyl-3-(3,5-di-tert-butyl-4-hydroxyphenyl)propionate is more preferable. Based on the total mass of the composition, containing 0.1-5% by mass of triphenyl phosphorothioate and 0.1-3% by mass of octadecyl-3-(3,5-di-tert-butyl-4-hydroxyphenyl)propionate is particularly preferable.

In particular, the following is preferable as having excellent water resistance and corrosion prevention: a grease composition for vehicular hub unit bearings comprising a base oil, a thickener, and an additive,
 wherein the base oil is a polyalphaolefin having a kinematic viscosity at 40° C. of 25-40 mm²/s,
 the thickener is a mixture of the compound of formula (1) above, the compound of formula (2) above, and the compound of formula (3) above, wherein, in formulas (1)-(3), R2 represents a divalent aromatic hydrocarbon group having 6 to 15 carbon atoms; R1 represents a cyclohexyl group; R3 represents a linear alkyl group having 16 to 20 carbon atoms; and a ratio (R3/(R1+R3))×100 of a molar amount of the linear alkyl group having 16 to 20 carbon atoms to a total molar amount of the cyclohexyl group and the linear alkyl group having 16 to 20 carbon atoms is 10-20%,
 the content of the thickener is 10-20% by mass based on the total mass of the composition,
 the content of the carboxylic acid-based corrosion inhibitor is 0.2-1% by mass, the content of the carboxylic acid salt-based corrosion inhibitor is 0.3-1% by mass, and the content of the fatty acid amine salt is 0.5-2% by mass, and
 the grease composition
  further contains triphenyl phosphorothioate as the additive, and
  has a worked penetration of 220-270.

Furthermore, the following is preferable as having excellent water resistance and corrosion prevention: a grease composition for vehicular hub unit bearings comprising a base oil, a thickener, and additives,
 wherein the base oil is a polyalphaolefin having a kinematic viscosity at 40° C. of 25-40 mm²/s,
 the thickener is a mixture of the compound of formula (1) above, the compound of formula (2) above, and the compound of formula (3) above, wherein, in formulas (1)-(3), R2 represents a divalent aromatic hydrocarbon group having 6 to 15 carbon atoms; R1 represents a cyclohexyl group; R3 represents a linear alkyl group having 18 carbon atoms; and a ratio (R3/(R1+R3))×100 of a molar amount of the linear alkyl group having 18 carbon atoms to a total molar amount of the cyclohexyl group and the linear alkyl group having 18 carbon atoms is 10-15%,
 the content of the thickener is 10-20% by mass based on the total mass of the composition,
 the content of the carboxylic acid-based corrosion inhibitor containing an alkenyl succinic acid half ester is 0.2-0.4% by mass, the content of the carboxylic acid salt-based corrosion inhibitor containing zinc abietate is 0.3-0.4% by mass, and the content of the fatty acid amine salt is 0.9-1.1% by mass, and
 the grease composition
  further contains triphenyl phosphorothioate and a phenolic antioxidant as the additives, and
  has a worked penetration of 220-270.

Among these, the following is preferable as having excellent low torque, water resistance, and corrosion prevention: a grease composition for vehicular hub unit bearings comprising a base oil, a thickener, and additives,
 wherein the base oil is a polyalphaolefin having a kinematic viscosity at 40° C. of 25-35 mm²/s,
 the content of the base oil is 75-85% by mass based on the total mass of the composition,
 the thickener is a mixture of the compound of formula (1) above, the compound of formula (2) above, and the compound of formula (3) above, wherein, in formulas (1)-(3), R2 represents a divalent aromatic hydrocarbon group having 6 to 15 carbon atoms; R1 represents a cyclohexyl group; R3 represents a linear alkyl group having 18 carbon atoms; and a ratio (R3/(R1+R3))×100 of a molar amount of the linear alkyl group having 18 carbon atoms to a total molar amount of the cyclohexyl group and the linear alkyl group having 18 carbon atoms is 10-15%,
 the content of the thickener is 10-20% by mass based on the total mass of the composition,
 the content of the carboxylic acid-based corrosion inhibitor containing an alkenyl succinic acid half ester is 0.2-0.4% by mass, the content of the carboxylic acid salt-based corrosion inhibitor containing zinc abietate is 0.3-0.4% by mass, and the content of the fatty acid amine salt is 0.9-1.1% by mass, and
 the grease composition
  further contains triphenyl phosphorothioate and octadecyl-3-(3,5-di-tert-butyl-4-hydroxyphenyl)propionate as the additives, and
  has a worked penetration of 230-265.

Especially, the following is preferable as having excellent low torque, water resistance, and corrosion prevention: a grease composition for vehicular hub unit bearings comprising a base oil, a thickener, and additives,
 wherein the base oil is a polyalphaolefin having a kinematic viscosity at 40° C. of 25-35 mm²/s,
 the content of the base oil is 75-85% by mass based on the total mass of the composition,
 the thickener is a mixture of the compound represented by formula (1) in which R1 is a cyclohexyl group, R2 is a group derived from 4,4'-diphenylmethane diisocyanate, and R3 is a linear alkyl group having 18 carbon atoms, the compound represented by formula (2) in which R1 is a cyclohexyl group and R2 is a group derived from 4,4'-diphenylmethane diisocyanate, and the compound represented by formula (3) in which R2 is a group derived from 4,4'-diphenylmethane diisocyanate and R3 is a linear alkyl group having 18 carbon atoms, wherein the molar ratio is 11.5-13.5%,
 the content of the thickener is 13-17% by mass based on the total mass of the composition,
 the total amount of the alkenyl succinic acid half ester and (tetrapropenyl)butanedioic acid is 0.2-0.4% by mass, the total amount of zinc naphthenate and zinc abietate is 0.3-0.4% by mass, and the total amount of the fatty acid amine salt is 0.9-1.1% by mass, and
 the grease composition
  further contains 0.1-5% by mass of triphenyl phosphorothioate and 0.1-3% by mass of octadecyl-3-(3,5-di-tert-butyl-4-hydroxyphenyl)propionate as the additives, and
  has a worked penetration of 235-265.

<Applications>

The grease composition of the present invention is used for vehicular hub unit bearings, in particular vehicular hub unit bearings for electric vehicles.

EXAMPLES

For a grease composition containing an alicyclic aliphatic diurea-based thickener as a thickener, a predetermined amount of raw material amines (cyclohexylamine and stearylamine at a molar ratio of cyclohexylamine:stearylamine=7:1) at a ratio of 2 moles per 1 mole of 4,4'-diphenylmethane diisocyanate was reacted in a base oil, then heated and cooled to prepare a base grease. A predetermined amount of additives was mixed with the base oil, added to the base grease, thoroughly mixed, and kneaded with a 3-roll mill to produce a grease composition having a predetermined worked penetration.

For a grease composition containing an aromatic diurea-based thickener as a thickener, a predetermined amount of raw material amine (p-toluidine) at a ratio of 2 moles per 1 mole of 4,4'-diphenylmethane diisocyanate was reacted in a base oil, then heated and cooled to prepare a base grease. A predetermined amount of additives was mixed with the base oil, added to the base grease, thoroughly mixed, and kneaded with a 3-roll mill to produce a grease composition having a predetermined worked penetration.

[Bearing Torque Test]

The grease composition was sealed into a rolling bearing, and the inner ring was rotated under the following conditions to measure the torque on the outer ring of the bearing after 60 minutes of rotation.
  Bearing type: Deep groove ball bearing 6204
  Test temperature: Room temperature
  Rotation speed: 3000 rpm
  Test load: Axial load 500 N
    Radial load 250 N
  Amount of grease sealed: About 1.4 g
  Evaluation: ◯; Bearing torque less than 70 mN·m
    ×; Bearing torque 70 mN·m or more

[Low Temperature Torque Test]

The test was performed in accordance with JIS K 2220 18. Low Temperature Torque Test Method.
  Test temperature: −40° C.
  Evaluation: ◯; Starting torque less than 500 mN·m
    ×; Starting torque 500 mN·m or more

[High Temperature Durability Test]

The grease composition was sealed into a rolling bearing and tested for bearing lubrication life under high temperature conditions by rotating the inner ring. The rolling bearing was operated in accordance with the conditions shown below. The time until the motor showed overcurrent was taken as the lubrication life to evaluate durability.
  Bearing type: Angular contact ball bearing 7206
  Test temperature: 150° C.
  Rotation speed: 6000 rpm
  Test load: Axial load 1500 N
  Amount of grease sealed: About 10 g
  Evaluation: ◯; Life time 150 hours or more
    ×; Life time less than 150 hours

[Water Resistance Test]

The water resistance of the test greases was evaluated by a four-ball test. That is, three 15-mm-diameter bearing steel balls were placed in an equilateral triangular arrangement in a cylindrical container with an inner diameter of 36.0 mm at the bottom face, an inner diameter of 31.63 mm at the top end, and a depth of 10.98 mm, and were coated with 20 g of the test grease mixed with 20% water. Then, one ⅝ inch diameter bearing steel ball (with about 200 μm dents at 6 equally spaced locations on the contact areas with the 3 balls) was placed in the cavity formed by the 3 balls. At room temperature, the ⅝ inch ball was rotated at 1200 rpm under a surface pressure of 4.1 GPa. This caused the three 15-mm-diameter bearing balls to also rotate while revolving. Rotation was continued until peeling occurred, and the total number of revolutions until peeling was taken as the life.
  Evaluation: ◯; Total number of revolutions is $1000 \times 10^3$ revolutions or more
    ×: Total number of revolutions is less than $1000 \times 10^3$ revolutions

[Corrosion Prevention Test—Durability Test in Presence of Water]

The test was performed in accordance with ASTM D1743 Bearing Corrosion Prevention Test. However, while the standard specifies distilled water for immersing the bearing, this test employed 1% saline solution, which means more severe conditions. Evaluation was made based on the presence or absence of corrosion on the outer ring raceway.
  Evaluation: ◯; No corrosion
    ×; Corrosion present

TABLE 1

|  |  | Example 1 | Example 2 | Example 3 | Example 4 | Example 5 |
| --- | --- | --- | --- | --- | --- | --- |
| Base Oil | Polyalphaolefin Oil | Balance | Balance | Balance | Balance | Balance |
|  | Kinematic Viscosity (40° C.) mm$^2$/s | 30 | 25 | 50 | 30 | 30 |
| Thickener | Alicyclic Aliphatic Diurea | 16 | 16 | 16 | 13 | 18 |
|  | Aromatic Diurea | — | — | — | — | — |
| Antioxidant | Octadecyl-3-(3,5-di-tert-butyl-4-hydroxyphenyl)propionate | 1 | 1 | 1 | 1 | 1 |
| Corrosion Inhibitor | Carboxylic Acid-Based Corrosion Inhibitor | 0.60 | 0.60 | 0.60 | 0.60 | 0.60 |
|  | Carboxylic Acid Salt-Based Corrosion Inhibitor | 0.38 | 0.38 | 0.38 | 0.38 | 0.38 |
|  | Fatty Acid Amine Salt-Based Corrosion Inhibitor | 0.56 | 0.56 | 0.56 | 0.56 | 0.56 |
|  | Barium Sulfonate | — | — | — | — | — |
| Wear Inhibitor | Triphenyl Phosphorothioate | 1 | 1 | 1 | 1 | 1 |
| Penetration |  | 250 | 250 | 250 | 270 | 220 |
| Performance Evaluation | Bearing Torque Test | ◯ | ◯ | ◯ | ◯ | ◯ |
|  | Low Temperature Torque Test | ◯ | ◯ | ◯ | ◯ | ◯ |
|  | High Temperature Durability Test | ◯ | ◯ | ◯ | ◯ | ◯ |
|  | Water Resistance Test | ◯ | ◯ | ◯ | ◯ | ◯ |
|  | Corrosion Prevention Test | ◯ | ◯ | ◯ | ◯ | ◯ |

TABLE 1-continued

|  |  | Comparative Example 1 | Comparative Example 2 | Comparative Example 3 | Comparative Example 4 | Comparative Example 5 |
|---|---|---|---|---|---|---|
| Base Oil | Polyalphaolefin Oil | Balance | Balance | Balance | Balance | Balance |
|  | Kinematic Viscosity (40° C.) mm²/s | 30 | 30 | 30 | 16 | 62 |
| Thickener | Alicyclic Aliphatic Diurea | 12 | 19 | — | 16 | 16 |
|  | Aromatic Diurea | — | — | 23 | — | — |
| Antioxidant | Octadecyl-3-(3,5-di-tert-butyl-4-hydroxyphenyl)propionate | 1 | 1 | 1 | 1 | 1 |
| Corrosion Inhibitor | Carboxylic Acid-Based Corrosion Inhibitor | 0.60 | 0.60 | 0.60 | 0.60 | 0.60 |
|  | Carboxylic Acid Salt-Based Corrosion Inhibitor | 0.38 | 0.38 | 0.38 | 0.38 | 0.38 |
|  | Fatty Acid Amine Salt-Based Corrosion Inhibitor | 0.56 | 0.56 | 0.56 | 0.56 | 0.56 |
|  | Barium Sulfonate | — | — | — | — | — |
| Wear Inhibitor | Triphenyl Phosphorothioate | 1 | 1 | 1 | 1 | 1 |
| Penetration |  | 290 | 200 | 270 | 250 | 250 |
| Performance Evaluation | Bearing Torque Test | X | ○ | X | ○ | X |
|  | Low Temperature Torque Test | ○ | X | X | ○ | ○ |
|  | High Temperature Durability Test | ○ | ○ | ○ | X | ○ |
|  | Water Resistance Test | ○ | ○ | ○ | ○ | ○ |
|  | Corrosion Prevention Test | ○ | ○ | ○ | ○ | ○ |

|  |  | Comparative Example 6 | Comparative Example 7 | Comparative Example 8 |
|---|---|---|---|---|
| Base Oil | Polyalphaolefin Oil | Balance | Balance | Balance |
|  | Kinematic Viscosity (40° C.) mm²/s | 30 | 30 | 30 |
| Thickener | Alicyclic Aliphatic Diurea | 16 | 16 | 16 |
|  | Aromatic Diurea | — | — | — |
| Antioxidant | Octadecyl-3-(3,5-di-tert-butyl-4-hydroxyphenyl)propionate | 1 | 1 | 1 |
| Corrosion Inhibitor | Carboxylic Acid-Based Corrosion Inhibitor | — | — | 0.60 |
|  | Carboxylic Acid Salt-Based Corrosion Inhibitor | — | — | 0.94 |
|  | Fatty Acid Amine Salt-Based Corrosion Inhibitor | — | — | 2.8 |
|  | Barium Sulfonate | — | 0.5 | — |
| Wear Inhibitor | Triphenyl Phosphorothioate | 1 | 1 | 1 |
| Penetration |  | 250 | 250 | 250 |
| Performance Evaluation | Bearing Torque Test | ○ | ○ | ○ |
|  | Low Temperature Torque Test | ○ | ○ | ○ |
|  | High Temperature Durability Test | ○ | ○ | ○ |
|  | Water Resistance Test | X | X | X |
|  | Corrosion Prevention Test | X | ○ | ○ |

*The blend is based on the total amount of grease (mass %)

What is claimed is:

1. A grease composition for vehicular hub unit bearings comprising:
    a base oil;
    a thickener; and
    an additive,
    wherein the base oil is a synthetic hydrocarbon oil having a kinematic viscosity at 40° C. of 25-50 mm²/s,
    the thickener is an alicyclic aliphatic diurea compound,
    the additive includes, based on a total mass of the composition, 0.2-0.4% by mass of a carboxylic acid-based corrosion inhibitor which is-contains an alkenyl succinic acid half ester, 0.3-0.4% by mass of a carboxylic acid salt-based corrosion inhibitor which comprises zinc abietate, and 0.9-1.1% by mass of an amine salt of a fatty acid wherein an amine constituting the amine salt is selected from the group consisting of octylamine, laurylamine, myristylamine, and stearylamine, and
    a worked penetration is 220-270.

2. The grease composition according to claim 1, wherein the thickener is a mixture of a compound represented by formula (1) below, a compound represented by formula (2) below, and a compound represented by formula (3) below:

R1-NHCONH—R2-NHCONH—R3     (1)

R1-NHCONH—R2-NHCONH—R1     (2)

R3-NHCONH—R2-NHCONH—R3     (3)

wherein R2 represents a divalent aromatic hydrocarbon group having 6 to 15 carbon atoms; R1 represents a cyclohexyl group; R3 represents a linear or branched alkyl group having 8 to 22 carbon atoms; and a ratio (R3/(R1+R3))×100 of a molar amount of the linear or branched alkyl group having 8 to 22 carbon atoms to a total molar amount of the cyclohexyl group and the linear or branched alkyl group having 8 to 22 carbon atoms is 10-20%.

3. The grease composition according to claim 1, wherein the thickener is contained in an amount of 10-20% by mass based on the total mass of the composition.

4. The grease composition according to claim 1, further comprising: triphenyl phosphorothioate as an additive.

5. The grease composition according to claim 1, further comprising: a phenolic antioxidant as an additive.

6. A vehicular hub unit bearing comprising:
    a hub constituting an inner ring-equivalent member together with an inner ring element;
    an outer ring; and
    a plurality of ball elements rollably arranged between the hub and the outer ring,
    wherein the grease composition according to claim 1 is sealed in a gap formed between the hub and the outer ring where the ball elements are arranged.

7. The grease composition according to claim 1, wherein the additive includes, based on a total mass of the composition, 0.2-0.4% by mass of a carboxylic acid-based corrosion inhibitor which contains an alkenyl succinic acid half ester and (tetrapropenyl) butanedioic acid, 0.3-0.4% by mass of a carboxylic acid salt-based corrosion inhibitor which contains zinc naphthenate and zinc abietate, and 0.9-1.1% by mass of an amine salt of a fatty acid wherein an amine constituting the amine salt is selected from the group consisting of octylamine, laurylamine, myristylamine, and stearylamine.

8. The grease composition according to claim 1, wherein the base oil consists of poly-alpha-olefin.

* * * * *